US012572289B2

(12) United States Patent
Segev et al.

(10) Patent No.: US 12,572,289 B2
(45) Date of Patent: Mar. 10, 2026

(54) JUST-IN-TIME LOW CAPACITY DRAM MEMORY ALLOCATION

(71) Applicant: SANDISK TECHNOLOGIES, INC., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/406,586

(22) Filed: Jan. 8, 2024

(65) Prior Publication Data

US 2025/0224890 A1     Jul. 10, 2025

(51) Int. Cl.
*G06F 12/00*          (2006.01)
*G06F 3/06*          (2006.01)

(52) U.S. Cl.
CPC .......... *G06F 3/0631* (2013.01); *G06F 3/0604* (2013.01); *G06F 3/0656* (2013.01); *G06F 3/0673* (2013.01)

(58) Field of Classification Search
CPC .... G06F 3/0631; G06F 3/0604; G06F 3/0656; G06F 3/0673; G06F 12/0238; G06F 12/0802; G06F 2212/22; G06F 2212/2515; G06F 2212/31; G06F 2212/60; G06F 2212/7202; G06F 2212/7203
See application file for complete search history.

(56) References Cited

U.S. PATENT DOCUMENTS

| | | | |
|---|---|---|---|
| 10,466,906 B2 | 11/2019 | Benisty | |
| 10,592,409 B2 | 3/2020 | Kanno | |
| 11,188,239 B2 | 11/2021 | Benisty et al. | |
| 11,847,323 B1 | 12/2023 | Segev et al. | |
| 2016/0011964 A1 | 1/2016 | Rostoker et al. | |
| 2018/0136875 A1 | 5/2018 | Nimmagadda et al. | |
| 2018/0260347 A1 | 9/2018 | Benisty | |
| 2019/0065102 A1 | 2/2019 | Shin et al. | |
| 2019/0294350 A1 | 9/2019 | Hahn et al. | |
| 2020/0050366 A1* | 2/2020 | Bavishi ................ G06F 3/0656 |
| 2020/0098423 A1 | 3/2020 | Huang et al. | |
| 2020/0151040 A1 | 5/2020 | Lee et al. | |
| 2020/0204503 A1 | 6/2020 | Cornett et al. | |
| 2021/0223994 A1 | 7/2021 | Kanno et al. | |
| 2021/0303199 A1 | 9/2021 | Horspool et al. | |
| 2022/0057959 A1 | 2/2022 | Yang et al. | |
| 2023/0112869 A1 | 4/2023 | Hwang et al. | |

FOREIGN PATENT DOCUMENTS

CN          107665091 A     2/2018

* cited by examiner

*Primary Examiner* — Shawn X Gu
(74) *Attorney, Agent, or Firm* — Patterson + Sheridan, LLP

(57) ABSTRACT

Instead of allocating unused resources, offload work from the host, and move to just-in-time, low capacity DRAM memory allocation. The host does a read and receives the location of the data in the response. This will offload the host from managing physical region page (PRP) lists. The data storage device counts the number of bytes that have been read by the host (per flash memory unit (FMU)), and the data storage device can release the buffer as soon as all the data has been read. The data storage device knows automatically when a buffer should be allocated/de-allocated just-in-time.

20 Claims, 7 Drawing Sheets

JUST-IN-TIME LOW CAPACITY DRAM MEMORY ALLOCATION

BACKGROUND OF THE DISCLOSURE

Field of the Disclosure

Embodiments of the present disclosure generally relate to improving buffer allocation of commands in solid state drives (SSD) to reduce utilized Dynamic Random Access Memory (DRAM) size.

Description of the Related Art

For Non-Volatile Memory express (NVMe)-SSD devices, when a host is doing a read command, the host involves many control operations on the host side as well as many unused resources allocated ahead of time, in both the host and the device. Having unused allocated resources takes up space in the system and decreases the efficiency.

When handing a read command, the system will perform many fetches. The fetches will be executed as the host checks with the data storage device on whether the data storage device is ready for the command. Current systems utilize ahead of time buffer allocation done by the host. Allocating the buffers requires a lot of time before using the buffers.

In order to support full throughput, more buffers are required since the life cycle of each buffer is longer. Also, looking at zone-append commands, the host prefers if the data storage device offloads as much management as possible. In the zone-append commands this is the logical block address (LBA) of write commands.

There is a need in the art for improving just in time buffer allocation and de-allocation in SSDs.

SUMMARY OF THE DISCLOSURE

Instead of allocating unused resources, offload work from the host, and move to just-in-time, low capacity DRAM memory allocation. The host does a read and receives the location of the data in the response. This will offload the host from managing physical region page (PRP) lists and reduce time randomly allocated to memory allowing the memory to remain empty. The DRAM savings is in the low memory foot print. The data storage device counts the number of bytes that have been read by the host (per flash memory unit (FMU)), and the data storage device can release the buffer as soon as all the data has been read. The buffers are managed more efficiently as the data storage device knows automatically when a buffer should be allocated/de-allocated just-in-time. This provides a short timespan for the data, reducing the amount of DRAM utilized.

In one embodiment, a data storage device comprises: a memory device; and a controller coupled to the memory device, wherein the controller is configured to: fetch a read command; read data for read command from the memory device; store the read data in a controller memory buffer (CMB); send the read data from CMB to a host device; and mark a CMB range of the read data as free.

In another embodiment, a data storage device comprises: a memory device; and a controller coupled to the memory device, wherein the controller is configured to: count an amount of data read from a controller memory buffer (CMB); send the read data from the CMB to a host device; and release allocated memory of the CMB based upon the counting.

In another embodiment, a data storage device comprises: means to store data; and a controller coupled to the means to store data, wherein the controller is configured to: retrieve a read command; retrieve data associated with the read command from the means to store data; store the retrieved data in a controller memory buffer (CMB), wherein the controller includes a first CMB and a second CMB distinct from the first CMB; and send the data from either the first CMB or the second CMB to a host device, wherein the sending comprises sending the data and a physical region page (PRP) list associated with the data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a block diagram illustrating a system for a read command flow, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of allocating unused resources, offload work from the host, and move to just-in-time, low capacity DRAM memory allocation. The host does a read and receives the location of the data in the response. This will offload the host from managing physical region page (PRP) lists and reduce time randomly allocated to memory allowing the memory to remain empty. The DRAM savings is in the low memory foot print. The data storage device counts the number of bytes that have been read by the host (per flash memory unit (FMU)), and the data storage device can release the buffer as soon as all the data has been read. The buffers are managed more efficiently as the data storage device knows automatically when a buffer should be allocated/de-allocated just-in-time. This provides a short timespan for the data, reducing the amount of DRAM utilized.

Figure 1:
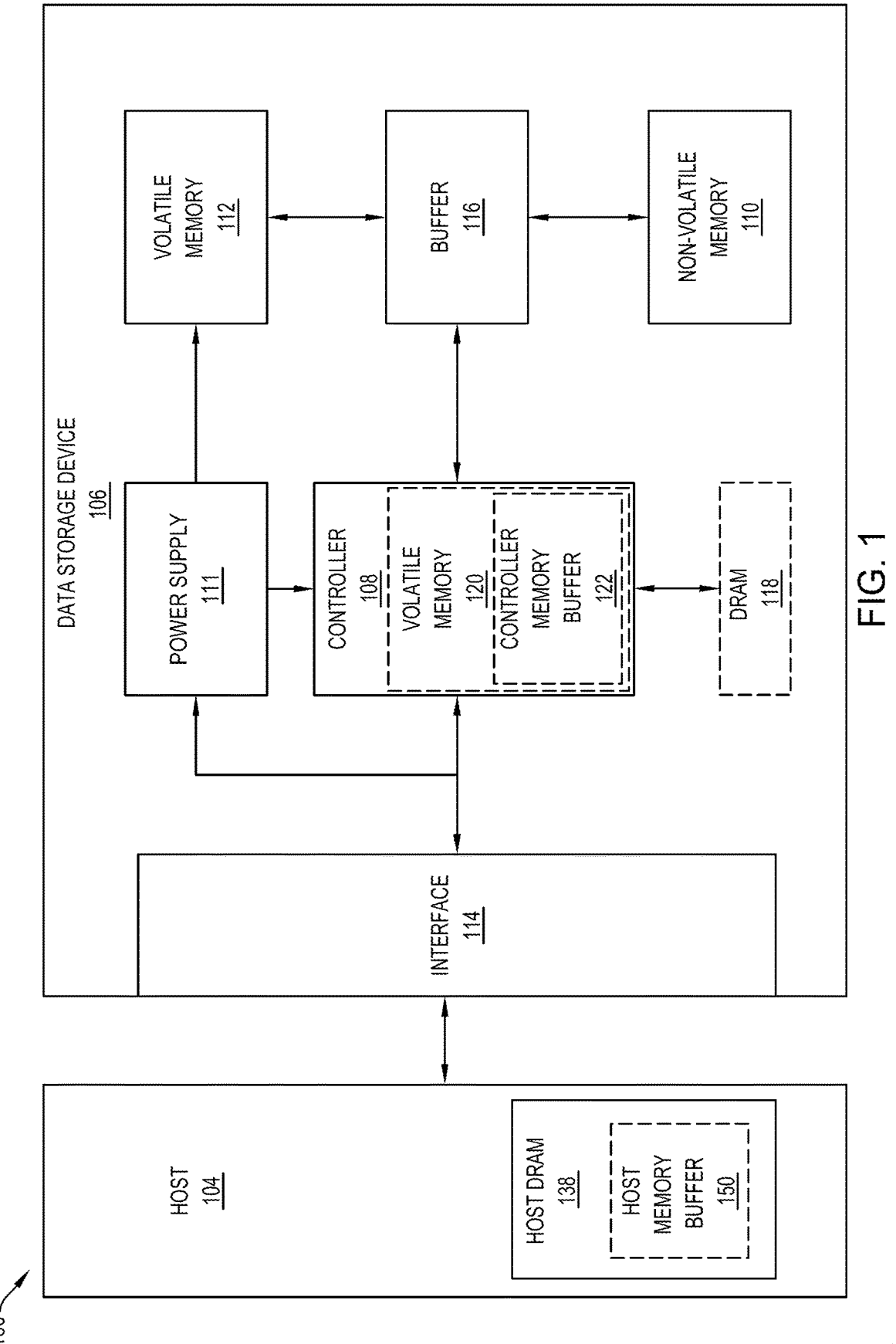
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
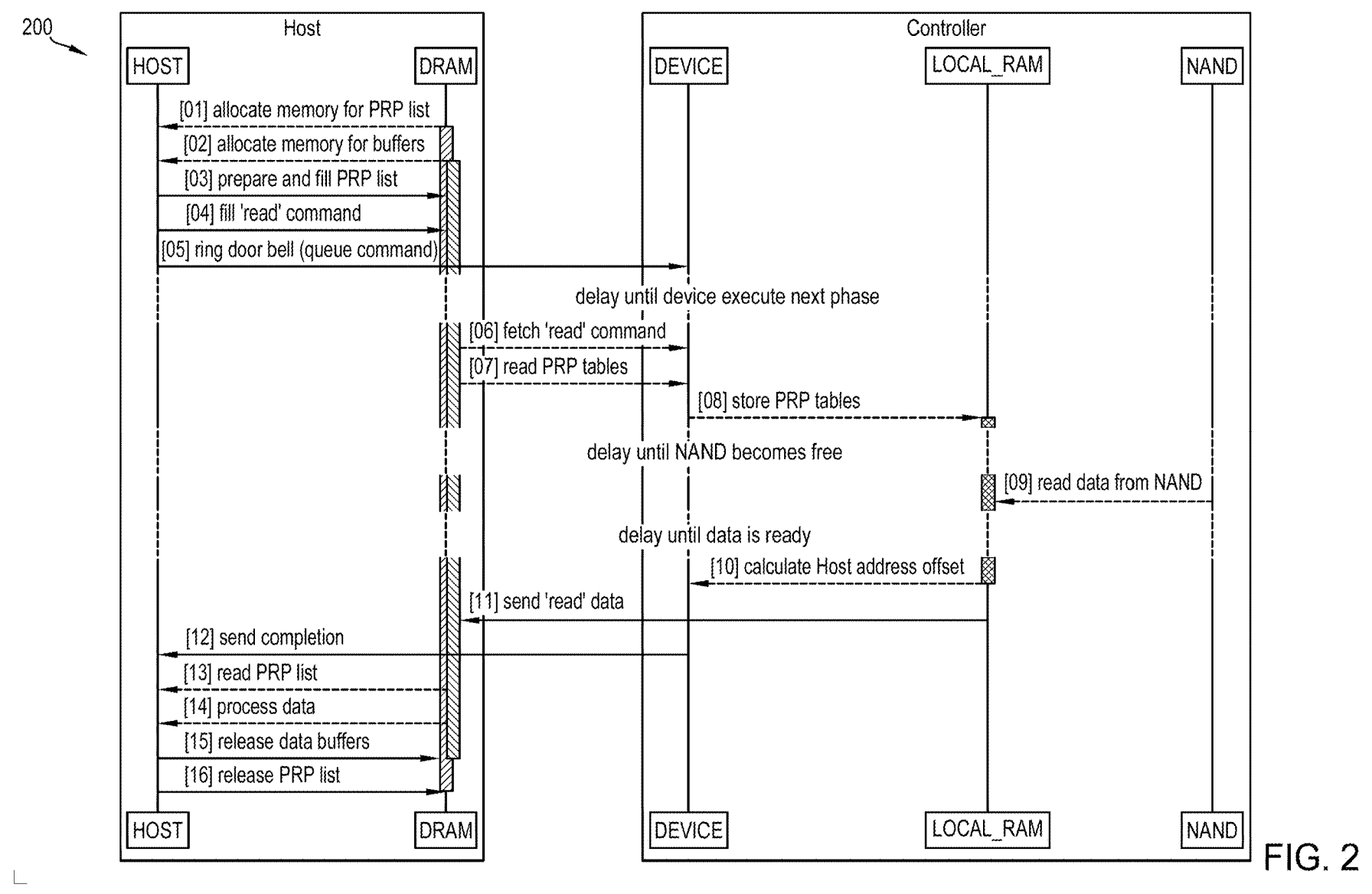

FIG. 2 is a block diagram illustrating a system 200 for a read command flow, according to one embodiment. The system 200 has a host side and a data storage device side. The host side has a host and a DRAM. The device side has a device, a local RAM and a memory device (e.g., NAND). At step a temporary/random allocated memory, of the PRP list (host side), and empty read buffers at step is reserved by the host. The memory allocated for data buffers becomes available at step [11]. In the device side, the local copy of the PRP list in the randomly allocated memory is prepared ahead of time in step [8] and is held until step [10].

The host allocates space for pointers at step [01]. The host allocates space for the data buffers at step [02]. The host prepares the list of pointers, pointing to the buffers at step [03]. The host prepares a command, the command includes pointers to the PRP list at step [04]. The host informs the device a command is ready at step [05]. Later, when the device is free, the device fetches the read command at step [06]. The device parses the command, and fetches the PRP pointers at step [07]. The device stores the PRP pointers in a temporary memory at step [08]. Later, when the NAND is not busy, and can service the read command, data is read from NAND to local memory at step [09]. Later, when reading from the NAND (and correcting errors if any) completes, the device reads the locally stored PRP at step [10]. The controller executes the read command by writing the 'data' to the pointers provided in the PRP list at step [11]. The device informs host the command is completed, and data is ready in its DRAM at step [12]. The host re-reads the PRP list at step [13]. The host can now read and use the data it requested at step [14]. The host releases the data buffers at step [15]. The host releases the PRP list at step [16].

As will be discussed herein, offloading the work from the host and moving to just in time low capacity DRAM memory allocation is useful. In particular, the host does a read and receives a location of the data in the response which will offload the host from managing PRP lists, reduce time randomly allocated memory is allocated, and stays empty. Additionally, a low memory footprint may be used to accomplish the offloading.

Figure 3:
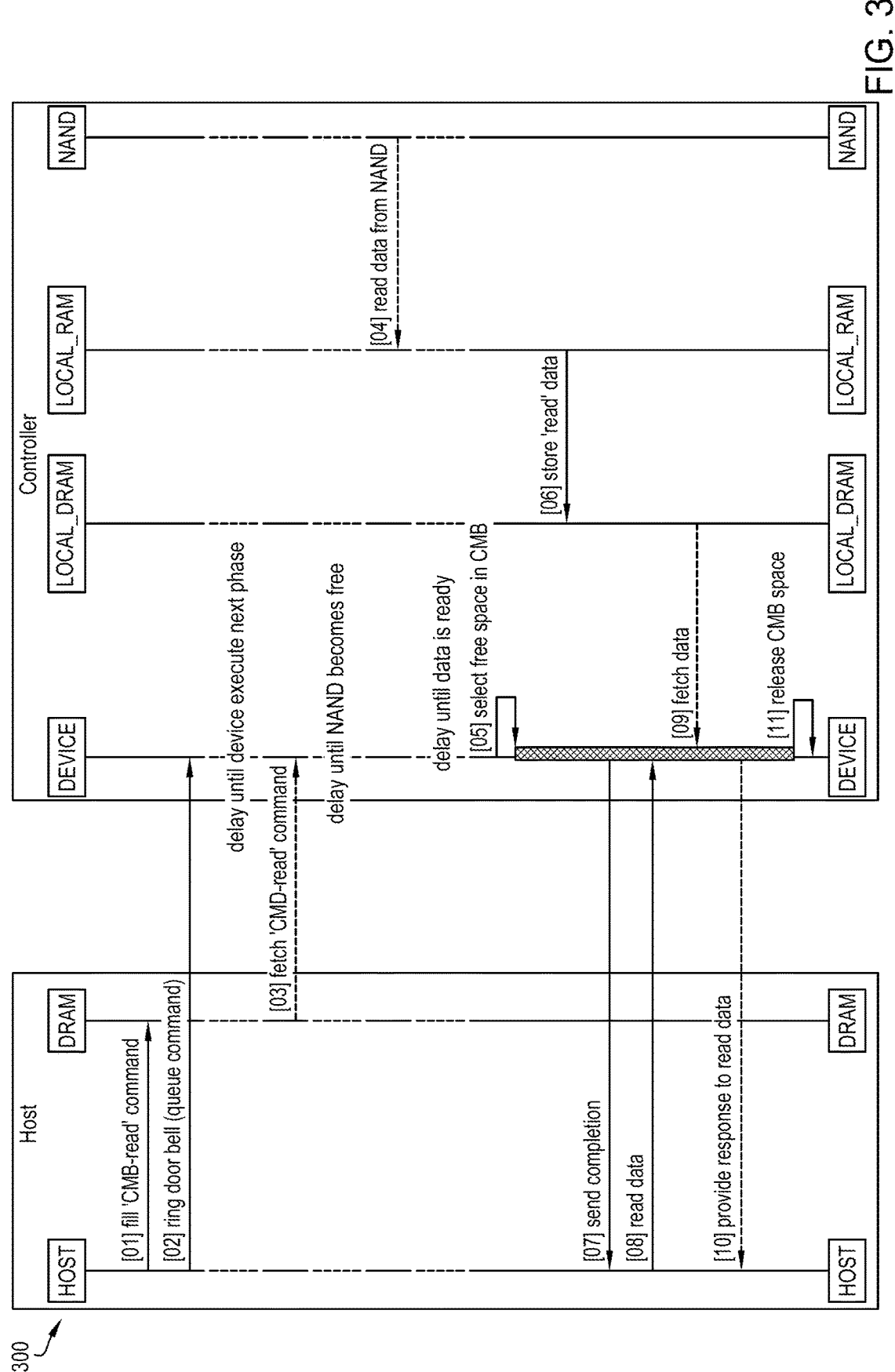
FIG. 3 is a block diagram illustrating a system for a host memory buffer (HMB) read flow, according to certain embodiments.

FIG. 3 is a block diagram illustrating a system 300 for a host memory buffer (HMB) read flow, according to certain embodiments. The host fills in a read command at step [01]. The host informs the data storage device a command is ready at step [02]. Later, when the device is free, the device fetches the read command at step [03]. Later, when the NAND is not busy, and can service the read command, data is read from NAND to local memory at step [04]. Later, when reading from the NAND (and correcting errors if any) completes, the device selects where to store the data (in local DRAM) at step [05]. The device stores data in local DRAM at step [06]. The device informs host the command is completed, and data is ready in its DRAM at block [07]. The host can now read the data from the CMB at step [08]. The device recognizes the read request, and brings the data from the CMB (local DRAM) at step [09]. The device send the data to the host at step [10]. The device marks said CMB range as free at step [11].

Figure 4:
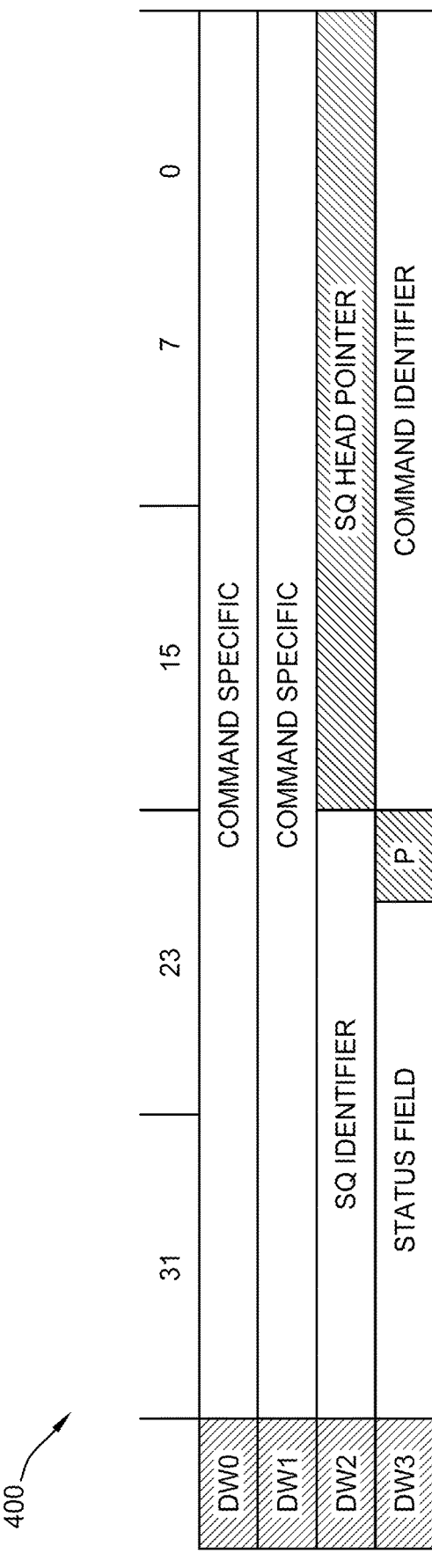
FIG. 4 is a block diagram illustrating a common completion queue entry layout, according to one embodiment.

FIG. 4 is a block diagram illustrating a common completion queue entry layout 400, according to one embodiment. The host can be informed of the data location in the completion. The command specific fields (DW0, DW1) will hold a pointer to the address of the data in the host's DRAM. The SQ identifier (DW2) will hold a SQ identifier. The SQ head pointer (DW2) will hold a SQ head pointer. The status field (DW3) holds the status field. The commands identifier (DW3) holds the command identifier.

Figure 5:
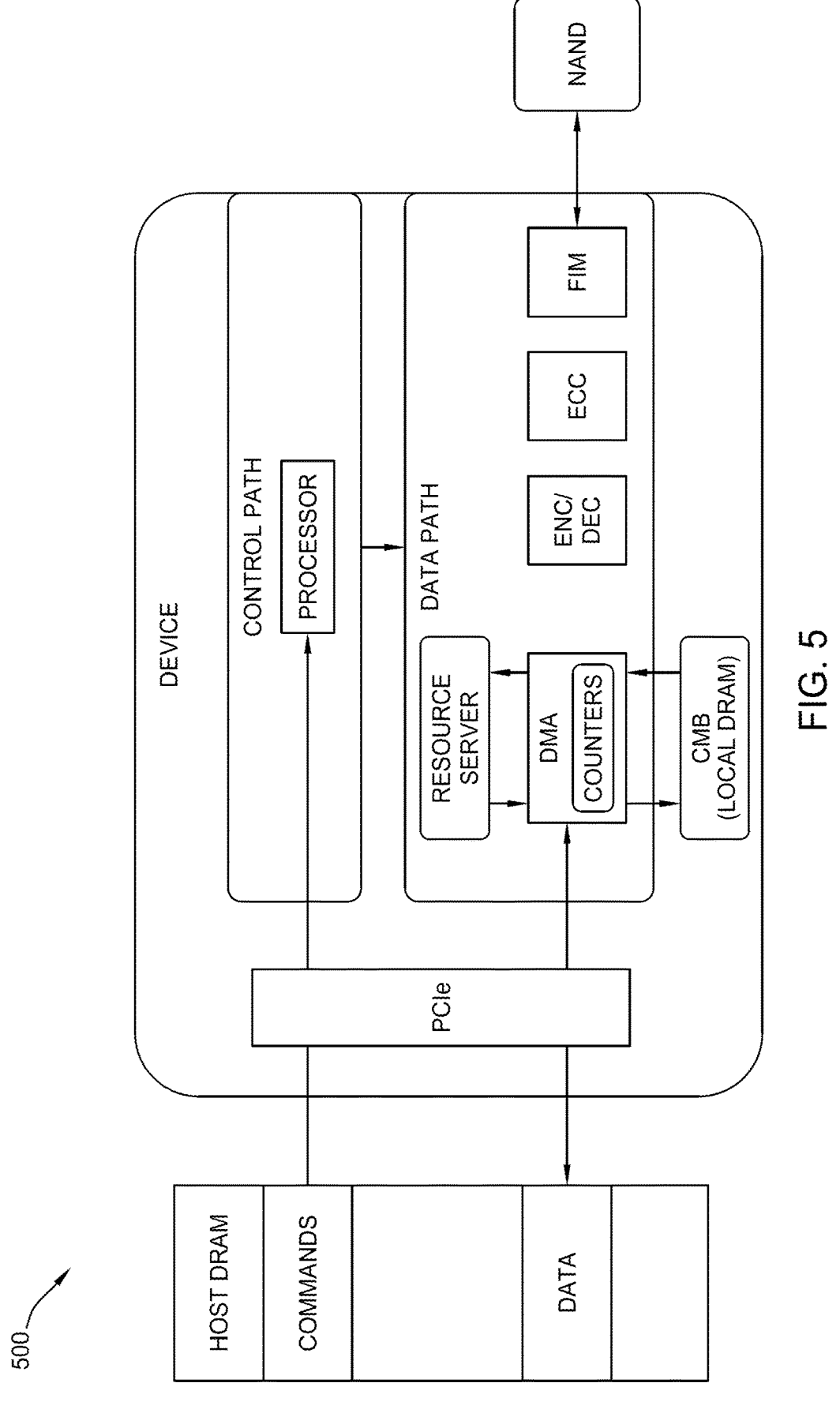
FIG. 5 is a block diagram illustrating a system for a controller memory buffer (CMB) memory management system, according to certain embodiments.

FIG. 5 is a block diagram illustrating a system 500 for a controller memory buffer (CMB) memory management system, according to certain embodiments. The system 500 comprises a host DRAM, a device, and a memory device (e.g., NAND). The host DRAM comprises commands and data. The device comprises a PCIe bus, a control path, and a data path. The control path comprises one or more processors. The data path comprises a resource server, a direct memory access (DMA) module, an encryption/decryption module, an error correction code (ECC) module, a flash interface module (FIM). The DMA comprises counters that communicate with the CMB (local DRAM).

The control path receives commands, then the control path triggers the data-path engine. The FIM reads data from the NAND. The ECC performs any error correction. The encryption/decryption module decrypts the data. The DMA writes the data to the host. The CMB utilizes local DRAM to store large amounts of temporary information. The resource server manages the memory allocation in the CMB range. When the DMA wants to transfer the data (and later completion) the DMA requests for a free memory range from the resource server.

The buffer release is where most of the DRAM savings occurs. The device counter will count the number of bytes that have been read by the host per FMU and release the buffer as soon as all the data has been read. Doing so provides a short timespan for the data, reducing the amount of DRAM utilized.

Figure 6:
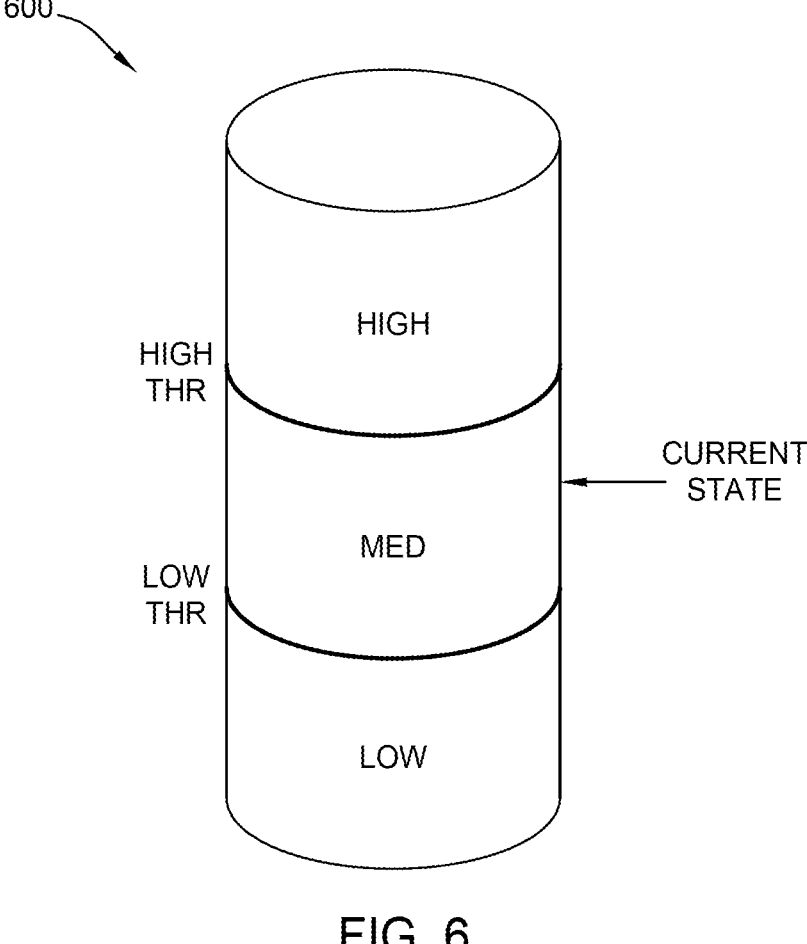
FIG. 6 is a block diagram illustrating a system for Thyristor Random Access Memory (TRAM) buffer occupancy, according to certain embodiments.

FIG. 6 is a block diagram illustrating a system 600 for TRAM buffer occupancy, according to certain embodiments. The device might, for low queue-depth, skip writing and reading from the DRAM. Skipping writing and reading will reduce the latency, as latency is meaningful for low-queue depth systems. The decision of skipping the DRAM phases, can be done based on TRAM occupancy.

The TRAM in this example has three levels of low, medium, and high, but could be more or less depending on the system. In this example the current state is at the medium level. When the TRAM's fill level moves to the high threshold, the DRAM is used. When the TRAM's fill level moves to the low threshold, the DRAM stops being used.

For a user defined command, the user defined command utilized support for the host device standardization. The user defined command can be used instead of a normal read command in the instant disclosure. As discussed herein, the data storage device handles the buffer allocation of a read command's destination. In so doing, the buffer is held for a shorter time and thus, reduces the overall DRAM size.

Figure 7:
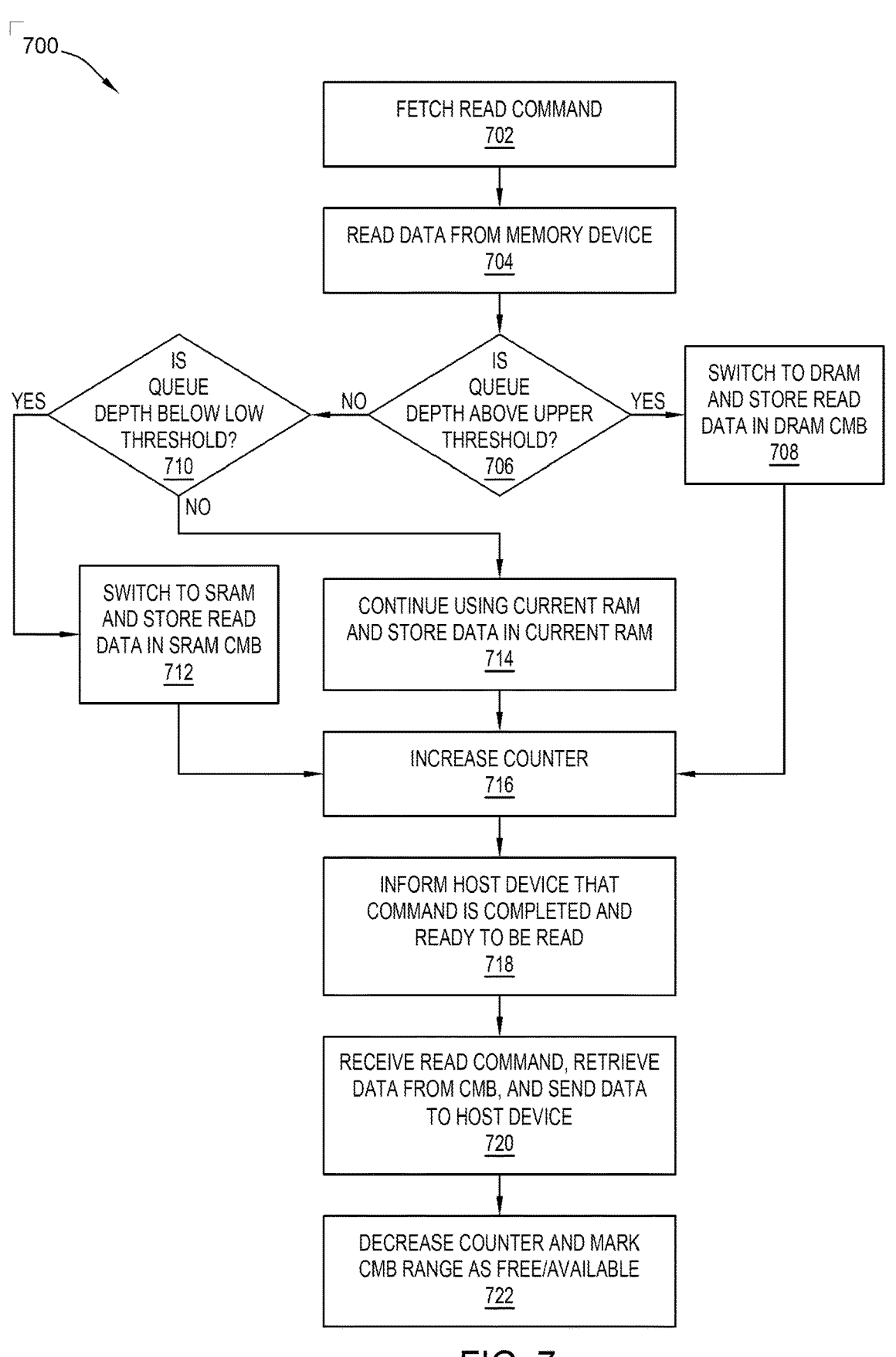
FIG. 7 is a flowchart illustrating a method for TRAM buffer allocation, according to certain embodiments.

FIG. 7 is a flowchart illustrating a method 700 for TRAM buffer allocation, according to certain embodiments. The method 700 begins at block 702. At block 702, the controller fetches a read command. At block 704, the controller reads data from the memory device. At block 706, the controller determines whether the queue depth is above an upper threshold. If the controller determines that the queue depth is above the upper threshold, then the method 700 proceeds to block 708. At block 708, the controller switches to DRAM and stores read data in DRAM CMB and then the method 700 proceeds to block 716. If the controller determines that the queue depth is not above the upper threshold, then the method 700 proceeds to block 710.

At block 710, the controller determines whether the queue depth is below a lower threshold. If the controller determines that the queue depth is below the lower threshold, then the method 700 proceeds to block 712. At block 712, the controller switches to SRAM and stores read data in SRAM CMB and then the method 700 proceeds to block 716. If the controller determines that the queue depth is not below the lower threshold, then the method 700 proceeds to block 714. At block 714, the controller continues using current RAM and stores data in current RAM and then the method proceeds to block 716. At block 716, the controller increases counter. At block 718, the controller informs the host device that the command is completed and ready to read. At block 720, the controller receives read command, retrieves data from CMB, and sends data to host device. At block 722, the controller decreases counter and mark CMB range as free/available.

Utilizing the embodiments discussed herein, the host reduces a lot of overhead (buffers management), resources are allocated just in time allowing for less memory storage allocation, resources are released very early, and there is a smaller overall DRAM footprint.

In one embodiment, a data storage device comprises: a memory device; and a controller coupled to the memory device, wherein the controller is configured to: fetch a read command; read data for read command from the memory device; store the read data in a controller memory buffer (CMB); send the read data from CMB to a host device; and mark a CMB range of the read data as free. The controller is further configured to detect a queue depth for a queue from where the read command is fetched. The controller is configured to determine whether the queue depth is above a first threshold or below a second threshold. The CMB includes a first CMB disposed in a first memory location and a second CMB disposed in a second memory location distinct form the first memory location, and wherein the storing is to the CMB in the first memory location when the queue depth is above the first threshold. The storing is to the CMB in the second memory location when the queue depth is below the second threshold. The first CMB is static random access memory (SRAM). The second CMB is dynamic random access memory (DRAM). The controller is configured to switch between a first memory location and a second memory location based upon the detected queue depth. The controller is configured to count an amount of data is read. The controller is configured to release allocated memory from the CMB in response to the counting.

In another embodiment, a data storage device comprises: a memory device; and a controller coupled to the memory device, wherein the controller is configured to: count an amount of data read from a controller memory buffer (CMB); send the read data from the CMB to a host device;

and release allocated memory of the CMB based upon the counting. The CMB includes a first CMB disposed in static random access memory (SRAM) and a second CMB disposed in dynamic random access memory (DRAM). The controller is configured to determine whether to store data read from the memory device in either the first CMB or the second CMB. The determining is based upon a predetermined queue depth threshold. The controller includes: a direct memory access (DMA) module; an encryption/decryption module; a flash interface module coupled to the memory device; and an error correction module. The DMA module include a counter for performing the counting. The DMA module is coupled to the CMB and a resource server that manages memory allocation for the CMB.

In another embodiment, a data storage device comprises: means to store data; and a controller coupled to the means to store data, wherein the controller is configured to: retrieve a read command; retrieve data associated with the read command from the means to store data; store the retrieved data in a controller memory buffer (CMB), wherein the controller includes a first CMB and a second CMB distinct from the first CMB; and send the data from either the first CMB or the second CMB to a host device, wherein the sending comprises sending the data and a physical region page (PRP) list associated with the data. The controller is configured to generate the PRP list. The controller is configured to: mark a corresponding CMB range as free or available based upon the sending; and determine whether the storing is to a CMB in static random access memory (SRAM) or dynamic random access memory (DRAM).

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
fetch a read command;
read data for the read command from the memory device;
store the read data in a controller memory buffer (CMB);
send the read data from the CMB to a host device;
mark a CMB range of the read data as free;
detect a queue depth for a queue from where the read command is fetched; and
determine whether the queue depth is above a first threshold or below a second threshold, wherein the CMB includes a first CMB disposed in a first memory location and a second CMB disposed in a second memory location distinct from the first memory location, and wherein the storing is to the CMB in the first memory location when the queue depth is above the first threshold.

2. The data storage device of claim 1, wherein the storing is to the CMB in the second memory location when the queue depth is below the second threshold.

3. The data storage device of claim 1, wherein the first CMB is static random access memory (SRAM).

4. The data storage device of claim 3, wherein the second CMB is dynamic random access memory (DRAM).

5. The data storage device of claim 1, wherein the controller is configured to switch between the first memory location and the second memory location based upon the detected queue depth.

6. The data storage device of claim 1, wherein the controller is configured to count an amount of data read.

7. The data storage device of claim 6, wherein the controller is configured to release allocated memory from the CMB in response to the counting.

8. A data storage device, comprising:
a memory device; and
a controller coupled to the memory device, wherein the controller is configured to:
count an amount of data read from a controller memory buffer (CMB);
send the read data from the CMB to a host device; and
release allocated memory of the CMB based upon the counting wherein the CMB includes a first CMB disposed in static random access memory (SRAM) and a second CMB disposed in dynamic random access memory (DRAM).

9. The data storage device of claim 8, wherein the controller is configured to determine whether to store data read from the memory device in either the first CMB or the second CMB.

10. The data storage device of claim 9, wherein the determining is based upon a predetermined queue depth threshold.

11. The data storage device of claim 8, wherein the controller includes:
a direct memory access (DMA) module;
an encryption/decryption module;
a flash interface module coupled to the memory device; and
an error correction module.

12. The data storage device of claim 11, wherein the DMA module include a counter for performing the counting.

13. A data storage device, comprising:
a memory device; and
a controller coupled to the memory device, wherein the controller is configured to:
count an amount of data read from a controller memory buffer (CMB);
send the read data from the CMB to a host device; and
release allocated memory of the CMB based upon the counting, wherein the controller includes:
a direct memory access (DMA) module, wherein the DMA module includes a counter for performing the counting;
an encryption/decryption module;
a flash interface module coupled to the memory device; and
an error correction module,
wherein the DMA module is coupled to the CMB and a resource server that manages memory allocation for the CMB.

14. A data storage device, comprising:
means to store data; and
a controller coupled to the means to store data, wherein the controller is configured to:
retrieve a read command;
retrieve data associated with the read command from the means to store data;
store the retrieved data in a controller memory buffer (CMB), wherein the controller includes a first CMB and a second CMB distinct from the first CMB; and send the data from either the first CMB or the second CMB to a host device, wherein the sending comprises sending the data and a physical region page (PRP) list associated with the data.

15. The data storage device of claim 14, wherein the controller is configured to generate the PRP list.

16. The data storage device of claim 14, wherein the controller is configured to:

mark a corresponding CMB range as free or available based upon the sending; and determine whether the storing is to a CMB in static random access memory (SRAM) or dynamic random access memory (DRAM).

17. The data storage device of claim 14, wherein the controller is further configured to detect a queue depth for a queue from where the read command is fetched.

18. The data storage device of claim 17, wherein the controller is configured to determine whether the queue depth is above a first threshold or below a second threshold.

19. The data storage device of claim 14, wherein the controller is configured to increase a counter after storing the retrieved data.

20. The data storage device of claim 19, wherein the controller is configured to decrease the counter after sending the data.

* * * * *